UNITED STATES PATENT OFFICE.

EDWIN LAWRENCE McTYRE, OF THOMASVILLE, GEORGIA.

COMPOSITION FOR CLEARING SUGAR.

SPECIFICATION forming part of Letters Patent No. 641,134, dated January 9, 1900.

Application filed March 7, 1899. Serial No. 708,079. (No specimens.)

*To all whom it may concern:*

Be it known that I, EDWIN LAWRENCE MC-TYRE, of Thomasville, in the county of Thomas and State of Georgia, have invented a new and Improved Sugar-Clarifying Composition, of which the following is a full, clear, and exact description.

The object of the invention is to provide a new and improved composition for clarifying brown or crude cane-sugar to produce sugar of a very high quality at a comparatively low cost.

In practice the cane-juice or saccharine liquid is boiled down to the sugar-point in a suitable boiler, pan, or kettle to form a mush, and the mush is then transferred to a trough or box having perforations or small openings in its bottom for straining the molasses until the mush becomes somewhat firm. I then sprinkle dry cornmeal-bran over the crust of the mush, and then apply a spongy and porous batter or mortar, composed of clay, chopped corn-husks, cornmeal-bran, and water, by spreading the batter evenly over the crust of the mush in the trough to a depth of about two inches. This batter, in conjunction with the bran, purges the sugar of its impurities by absorption of the coloring-matter, gum, or glucose, so that the sugar is clarified, and a further dripping of the molasses through the perforations in the bottom of the trough is facilitated. The batter is then carefully removed from the clarified sugar, and the latter is then taken out of the trough for refining or other purposes.

While good results can be obtained with the clay and chopped corn-husks without the bran, yet I preferably use the bran, as it assists and greatly facilitates the elimination of the impurities.

It is understood that the corn-husks with the clay form a spongy porous batter or mortar, which keeps moist for the desired length of time required to extract the impurities from the sugar and leaves the latter clear in the trough, as before mentioned. Furthermore, the batter composed of the ingredients mentioned can be very cheaply and readily manufactured and easily applied without danger of the clay becoming intermingled with the sugar in the trough, especially as the corn-husks give considerable strength to the clay and prevent the same from crumbling into small fragments.

Having thus fully described my invention, I claim as new and desire to secure by Letters Patent—

1. A batter for clarifying brown or crude cane-sugar, comprising clay, chopped corn-husks and water, as set forth.

2. A batter for clarifying brown or crude cane-sugar, consisting of clay, chopped corn-husks, bran and water, as set forth.

EDWIN LAWRENCE McTYRE.

Witnesses:
G. W. BEASLEY,
JOE M. MASSEY.